(12) United States Patent
Woss et al.

(10) Patent No.: US 9,330,183 B2
(45) Date of Patent: May 3, 2016

(54) APPROXIMATE PRIVACY INDEXING FOR SEARCH QUERIES ON ONLINE SOCIAL NETWORKS

(71) Applicant: Facebook, Inc., Menlo Park, CA (US)

(72) Inventors: Gintaras Andrius Woss, East Palo Alto, CA (US); Sriram Sankar, Palo Alto, CA (US); Zhongxian Chen, Sunnyvale, CA (US); Kihyuk Hong, Palo Alto, CA (US); Kedar Dhamdhere, Mountain View, CA (US); Rajat Raina, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 293 days.

(21) Appl. No.: 13/890,052

(22) Filed: May 8, 2013

(65) Prior Publication Data

US 2014/0337317 A1 Nov. 13, 2014

(51) Int. Cl.
*G06F 17/30* (2006.01)
*G06F 21/62* (2013.01)

(52) U.S. Cl.
CPC ...... *G06F 17/30867* (2013.01); *G06F 21/6263* (2013.01); *G06F 2221/2141* (2013.01)

(58) Field of Classification Search
CPC ............. G06F 17/30867; G06F 21/31; G06F 17/3002; G06F 17/30554; G06F 17/30696; G06F 17/30994
USPC .......................................... 707/722, 732, 734
See application file for complete search history.

(56) References Cited

U.S. PATENT DOCUMENTS

| | | | |
|---|---|---|---|
| 8,185,558 B1 * | 5/2012 | Narayanan et al. | 707/798 |
| 8,832,093 B2 * | 9/2014 | Redstone et al. | 707/724 |
| 2007/0094230 A1 | 4/2007 | Subramaniam | |
| 2009/0265319 A1 * | 10/2009 | Lehrman et al. | 707/3 |
| 2009/0265326 A1 * | 10/2009 | Lehrman et al. | 707/4 |
| 2012/0011111 A1 | 1/2012 | Ahn | |
| 2012/0047147 A1 * | 2/2012 | Redstone et al. | 707/748 |
| 2012/0102404 A1 | 4/2012 | Tiu, Jr. | |
| 2012/0166433 A1 | 6/2012 | Tseng | |
| 2012/0221581 A1 * | 8/2012 | Narayanan et al. | 707/748 |
| 2012/0297017 A1 | 11/2012 | Livshits | |
| 2013/0036109 A1 | 2/2013 | Kulick | |
| 2013/0103765 A1 | 4/2013 | Papakipos | |
| 2014/0025702 A1 * | 1/2014 | Curtiss | G06Q 50/01 707/769 |
| 2014/0172917 A1 * | 6/2014 | Coroy | G06F 21/6218 707/783 |
| 2015/0074825 A1 * | 3/2015 | Blake et al. | 726/28 |

OTHER PUBLICATIONS

International Search Report and Written Opinion for International Application PCT/US2014/036767, Sep. 14, 2014.
U.S. Appl. No. 13/556,072, filed Jul. 23, 2012, Lee.

* cited by examiner

*Primary Examiner* — Debbie Le
(74) *Attorney, Agent, or Firm* — Baker Botts L.L.P.

(57) ABSTRACT

In one embodiment, a method includes receiving from a first user of an online social network a search query, searching data stores to identify objects that match the search query, where identifying the objects is also based in part on the privacy setting for each object, determining for each identified object a visibility of the object with respect to the first user, and generating one or more search results corresponding to the search query.

19 Claims, 8 Drawing Sheets

APPROXIMATE PRIVACY INDEXING FOR SEARCH QUERIES ON ONLINE SOCIAL NETWORKS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

There may be information associated with particular users stored with the system (e.g., in connection with the corresponding user accounts). Each user may upload and submit information to the system. The system may store each user's information on behalf of that user and in association with that user. The user may access his information stored with the system. In addition, the user may choose to grant other users access to his information stored with the system.

SUMMARY OF PARTICULAR EMBODIMENTS

In particular embodiments, a user of a social-networking system may search for objects associated with the system using search queries.

In particular embodiments, the social-networking system may improve the indexing process by searching data stores for matching objects that have a privacy setting that is likely to allow the objects to be accessed by a querying user. In response to a search query received from a first user (i.e., the querying user), the social-networking system may access one or more data stores to search for matching objects. Typically, the social-networking system may perform privacy checks using a frontend process that filters out search results just before results are sent to the user. For example, access control using privacy settings may be performed by a frontend PHP process hosed by the social-networking system. After a data store has been searched to identify objects matching the search query, the privacy settings for each identified object may be used to filter out results that are not visible to the user, such that only objects that are visible to the user are sent to the user as search results. However, performing privacy checks at this step may result in a large number of objects that are identified when searching a data store to be filtered out, such that additional indexing must be performed in order to generate an adequate number of search results. The efficiency of the indexing process may be improved by applying privacy filters when querying data stores. In particular embodiments, the privacy check process may be approximated during indexing by searching for objects that both match the search query and also have a privacy setting that would allow the querying user to access the object. In this way, objects that are identified during indexing may effectively be pre-filtered based on privacy settings, such that the identified object are more likely to make it through the frontend privacy checks and be generated as search results. This may allow the social-networking system to reduce the amount of data over-fetching needed to generate search result.

DESCRIPTION OF EXAMPLE EMBODIMENTS

Figure 1:
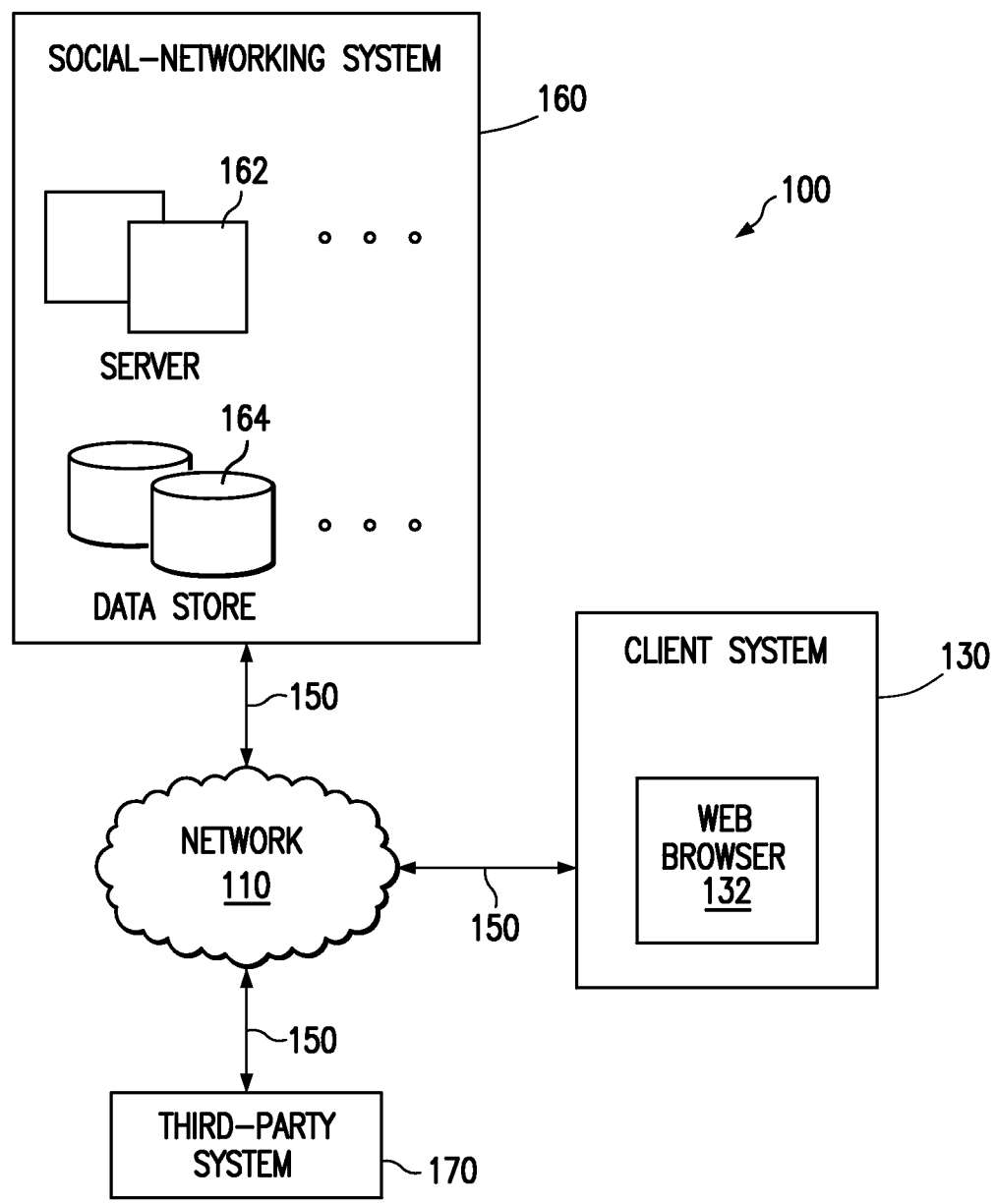
FIG. 1 illustrates an example network environment associated with a social-networking system.

FIG. 1 illustrates an example network environment 100 associated with a social-networking system. Network environment 100 includes client system 130, social-networking system 160, and third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. Client system 130 may enable a network user at client system 130 to access network 110. Client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable client system 130, social-networking system 160, or third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, third-party system 170 may include a third-party content object provider. A third-party content object provider may include one or more sources of content objects, which may be communicated to client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to client system 130. Information may be pushed to client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
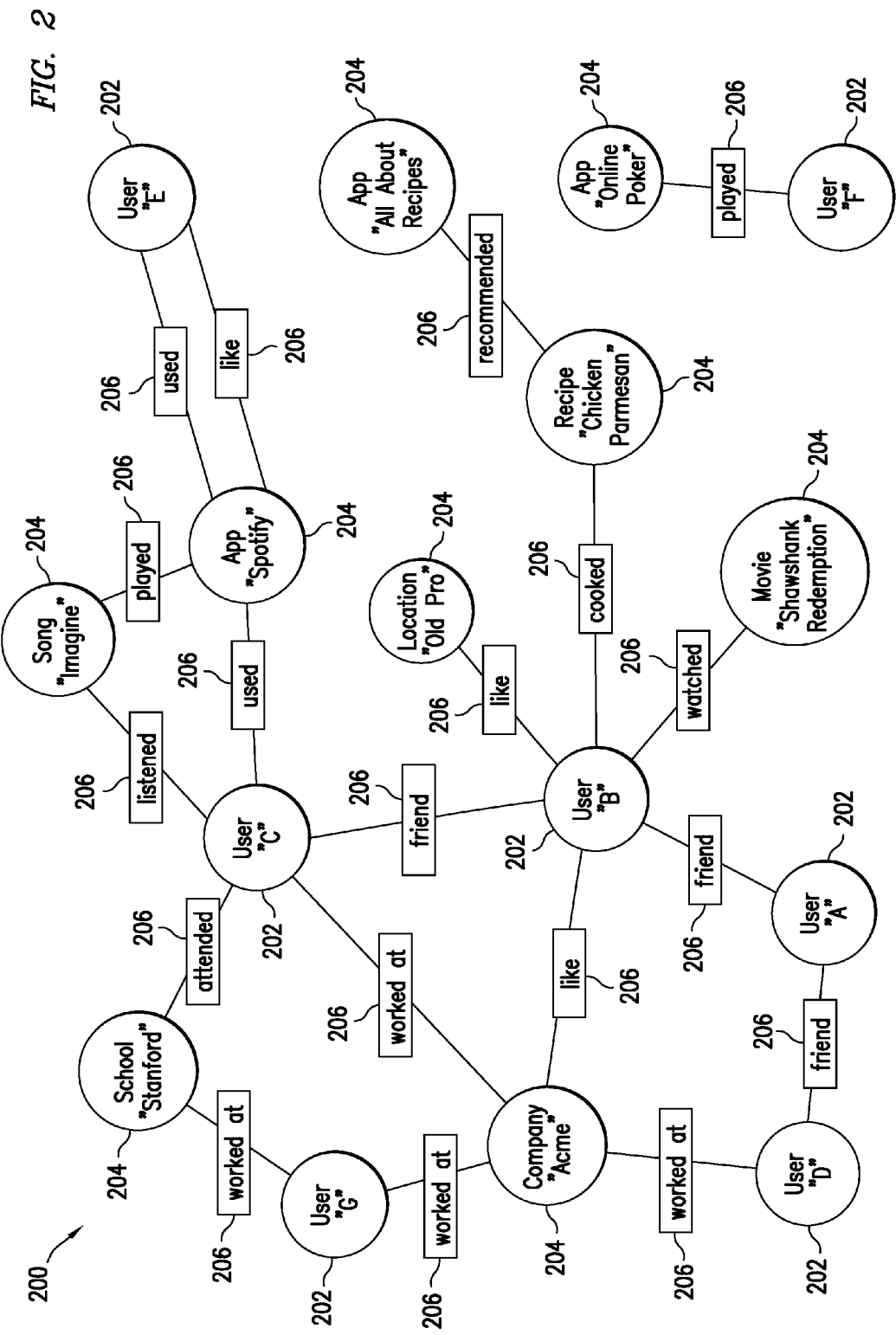
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Figure 3:
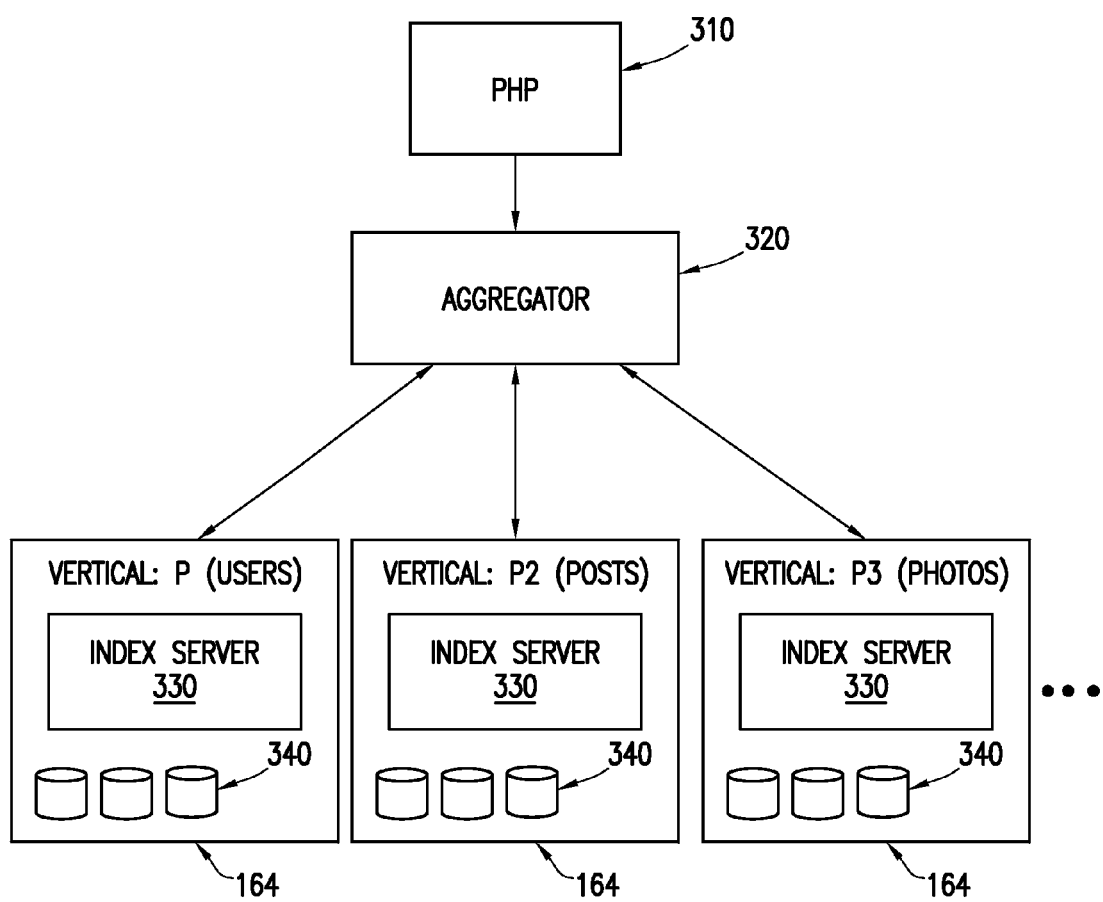
FIG. 3 illustrates an example partitioning for storing objects of a social-networking system.

FIG. 3 illustrates an example partitioning for storing objects of social-networking system 160. A plurality of data stores 164 (which may also be called "verticals") may store objects of social-networking system 160. The amount of data (e.g., data for a social graph 200) stored in the data stores may be very large. As an example and not by way of limitation, a social graph used by Facebook, Inc. of Menlo Park, Calif. can have a number of nodes in the order of $10^8$, and a number of edges in the order of $10^{10}$. Typically, a large collection of data such as a large database may be divided into a number of partitions. As the index for each partition of a database is smaller than the index for the overall database, the partitioning may improve performance in accessing the database. As the partitions may be distributed over a large number of servers, the partitioning may also improve performance and reliability in accessing the database. Ordinarily, a database may be partitioned by storing rows (or columns) of the database separately. In particular embodiments, a database may be partitioned by based on object-types. Data objects may be stored in a plurality of partitions, each partition holding data objects of a single object-type. In particular embodiments, social-networking system 160 may retrieve search results in response to a search query by submitting the search query to a particular partition storing objects of the same object-type as the search query's expected results. Although this disclosure describes storing objects in a particular manner, this disclosure contemplates storing objects in any suitable manner.

In particular embodiments, each object may correspond to a particular node of a social graph 200. An edge 206 connecting the particular node and another node may indicate a relationship between objects corresponding to these nodes. In addition to storing objects, a particular data store may also store social-graph information relating to the object. Alternatively, social-graph information about particular objects may be stored in a different data store from the objects. Social-networking system 160 may update the search index of the data store based on newly received objects, and relationships associated with the received objects.

In particular embodiments, each data store 164 may be configured to store objects of a particular one of a plurality of object-types in respective data storage devices 340. An object-type may be, for example, a user, a photo, a post, a comment, a message, an event listing, a webpage, an application, a location, a user-profile page, a concept-profile page, a user group, an audio file, a video, an offer/coupon, or another suitable type of object. Although this disclosure describes particular types of objects, this disclosure contemplates any suitable types of objects. As an example and not by way of limitation, a user vertical P1 illustrated in FIG. 3 may store user objects. Each user object stored in the user vertical P1 may comprise an identifier (e.g., a character string), a user name, and a profile picture for a user of the online social network. Social-networking system 160 may also store in the user vertical P1 information associated with a user object such as language, location, education, contact information, interests, relationship status, a list of friends/contacts, a list of family members, privacy settings, and so on. As an example and not by way of limitation, a post vertical P2 illustrated in FIG. 3 may store post objects. Each post object stored in the post vertical P2 may comprise an identifier, a text string for a post posted to social-networking system 160. Social-networking system 160 may also store in the post vertical P2 information associated with a post object such as a time stamp, an author, privacy settings, users who like the post, a count of likes, comments, a count of comments, location, and so on. As an example and not by way of limitation, a photo vertical P3 may store photo objects (or objects of other media types such as video or audio). Each photo object stored in the photo vertical P3 may comprise an identifier and a photo. Social-networking system 160 may also store in the photo vertical P3 information associated with a photo object such as a time stamp, an author, privacy settings, users who are tagged in the photo, users who like the photo, comments, and so on. In particular embodiments, each data store may also be configured to store information associated with each stored object in data storage devices 340.

In particular embodiments, objects stored in each vertical 164 may be indexed by one or more search indices. The search indices may be hosted by respective index server 330 comprising one or more computing devices (e.g., servers). The index server 330 may update the search indices based on data (e.g., a photo and information associated with a photo) submitted to social-networking system 160 by users or other processes of social-networking system 160 (or a third-party system). The index server 330 may also update the search indices periodically (e.g., every 24 hours). The index server 330 may receive a query comprising a search term, and access and retrieve search results from one or more search indices corresponding to the search term. In some embodiments, a vertical corresponding to a particular object-type may comprise a plurality of physical or logical partitions, each comprising respective search indices.

In particular embodiments, social-networking system 160 may receive a search query from a PHP (Hypertext Preprocessor) process 310. The PHP process 310 may comprise one or more computing processes hosted by one or more servers 162 of social-networking system 160. The search query may be a text string or a search query submitted to the PHP process by a user or another process of social-networking system 160 (or third-party system 170).

More information on indexes and search queries may be found in U.S. patent application Ser. No. 13/560,212, filed 27 Jul. 2012, U.S. patent application Ser. No. 13/560,901, filed 27 Jul. 2012, and U.S. patent application Ser. No. 13/723,861, filed 21 Dec. 2012, each of which is incorporated by reference.

In particular embodiments, one or more of the objects stored in a data store 164 may be associated with a privacy setting. The privacy settings (or "access settings") for an object may be stored in any suitable manner, such as, for example, in association with the object, in an index on the authorization server, in another suitable manner, or any combination thereof. Privacy settings may be managed or enforces via one or more authorization/privacy servers of social-networking system 160. A privacy setting of an object may specify how the object or particular information associated with an object can be accessed, viewed, or shared using the online social network. Where the privacy settings for an object allow a particular user to access, view, or share that object, the object may be described as being "visible" with respect to that user. As an example and not by way of limitation, a user of the online social network may set privacy settings for a user-profile page specifying a set of users that may access the work experience information on the user-profile page, thus excluding other users from accessing the information. In other words, the user-profile page may be not visible to the excluded users. In particular embodiments, the privacy settings may specify a "blocked list" of users that should not be allowed to access, view, or share certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element (or connections between elements), information associated with the social-graph element, or content objects associated with the social-graph element can be accessed or shared using the online social network. As an example and not by way of limitation, a particular concept node 204 corresponding to a particular photo may have a privacy setting specifying that the photo may only be viewed by users tagged in the photo and their friends. In particular embodiments, an authorization server may allow users to opt in or opt out of having their actions logged by social-networking system 160 or shared with other systems (e.g., third-party system 170), such as, for example, by specifying appropriate privacy settings. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. In particular embodiments, privacy/access settings may place additional restrictions on accessing an object or information associated with the objects. Additional restrictions may include, for example, granting access to only users legally allowed to drink alcohol, granting access to only those with shared experiences or shared interests, restricting access to minors, restriction access to content owned by minors, children, or deceased persons, or any combination thereof. Although this disclosure describes using particular privacy settings in a particular manner, this disclosure contemplates using any suitable privacy settings in any suitable manner.

In particular embodiments, one or more authorization/privacy servers may be used to enforce one or more privacy settings for objects associated with the online social network. The authorization servers may be one or more servers 162 of social-networking system 160. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to view or access the object. In other words, the object must have a visibility that is visible to the querying user. If the object has a visibility that is not visible to the user, the object may be excluded from the search results. In particular embodiments, the privacy settings for social-graph elements may be storied a data structure that may be represented as a privacy graph having a number of nodes and edges. The privacy graph may represent the visibility of particular social-graph elements with respect to each other based on their connections to each other. When a user requests a specific piece of information stored in data store 164, the access control of the social-graph element may be verified and validated with respect to the requesting user or entity by dynamically (e.g., in real time) filtering with respect to the privacy graph. Although this disclosure describes enforcing privacy settings in a particular manner, this disclosure contemplates enforcing privacy settings in any suitable manner.

Figure 4:
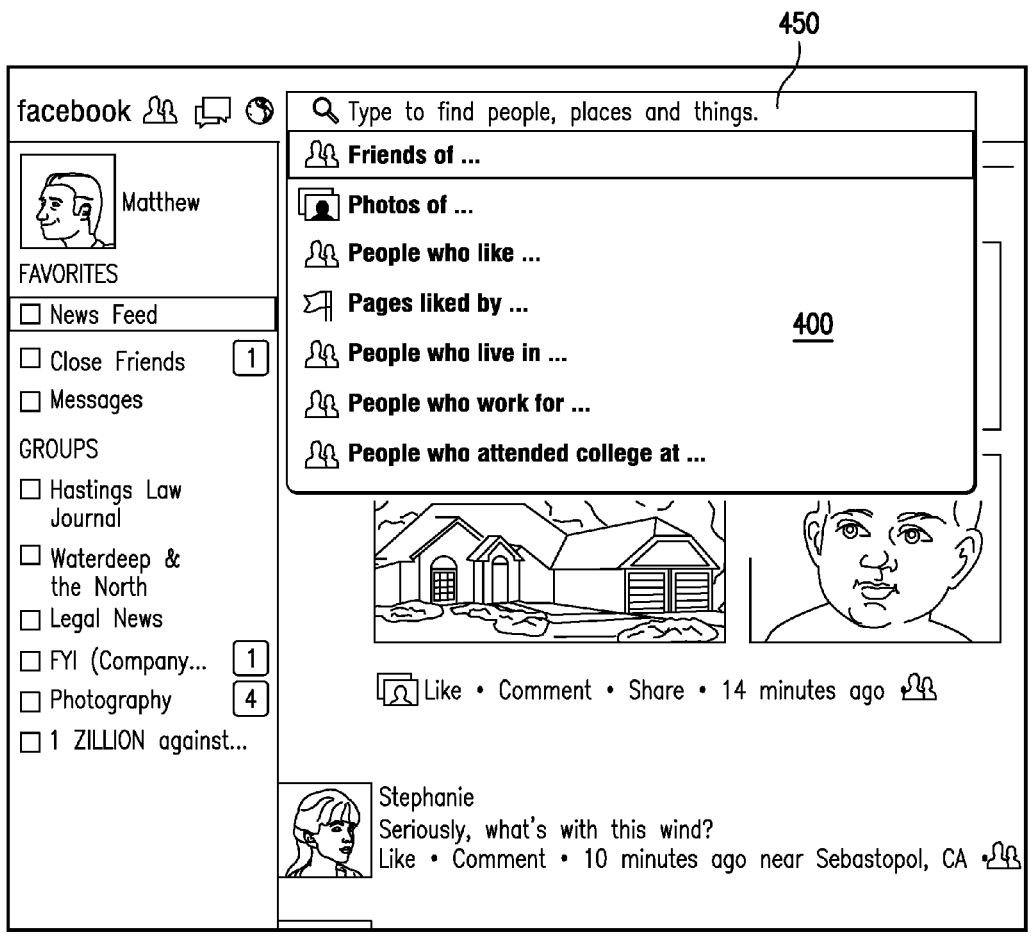
FIG. 4 illustrates an example webpage of an online social network.

FIG. 4 illustrates an example webpage of an online social network. In particular embodiments, a user may submit a query to the social-network system 160 by inputting text into query field 450. A user of an online social network may search for particular content objects (hereinafter "objects") or content-object-types (hereinafter "object-types") associated with the online social network (e.g., users, concepts, webpages, external content or resources) by providing a short phrase describing the object or object-type, often referred to as a "search query," to a search engine. Social-networking system 160 may then search one or more data stores 164 to identify objects matching the query. The search engine may conduct a search based on the query using various search algorithms and generate search results that identify objects (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified objects may include, for example, social-graph elements (i.e., user nodes 202, concept nodes 204, edges 206), profile pages, external webpages, or any combination thereof. Social-networking system 160 may then generate a search-results webpage with search results corresponding to the identified objects and send the search-results webpage to the user. In particular embodiments, the search engine may limit its search to objects associated with the online social network. However, in particular embodiments, the search engine may also search for objects associated with other sources, such as third-party system 170, the internet or World Wide Web, or other suitable sources. Although this disclosure describes querying the online social network in a particular manner, this disclosure contemplates querying the online social network in any suitable manner. In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, each of which is incorporated by reference.

In particular embodiments, social-networking system 160 may improve the indexing process by searching data stores 164 for matching objects that have a privacy setting that is likely to allow the objects to be accessed by a querying user. In response to a search query received from a first user (i.e., the querying user), social-networking system 160 may access one or more data stores 164 to search for matching objects. In particular embodiments, social-networking system 160 may perform privacy checks using a frontend process that filters out search results just before results are sent to the user. As an example and not by way of limitation, access control using privacy settings may be performed by a PHP process 310 hosed by one or more servers 162 of social-networking system 160. After a data store 164 has been searched to identify objects matching the search query, the privacy settings for each identified object may be used to filter out results that are not visible to the user, such that only objects that are visible to the user are sent to the user as search results. However, performing privacy checks at this step may result in a large number of objects that are identified when indexing a data store 164 to be filtered out, such that additional indexing must be performed in order to generate an adequate number of search results. The efficiency of the indexing process may be improved by applying privacy filters when querying data stores 164. In particular embodiments, the privacy check process may be approximated during indexing by searching for objects that both match the search query and also have a privacy setting that would allow the querying user to access the object. In this way, objects that are identified during indexing may effectively be pre-filtered based on privacy settings, such that the identified object are more likely to make it through the frontend privacy checks and be generated as search results. This may allow social-networking system 160 to reduce the amount of data over-fetching needed to generate search result. Although this disclosure describes searching an online social network using approximate privacy indexing in a particular manner, this disclosure contemplates searching an online social network using approximate privacy indexing in any suitable manner.

In particular embodiments, social-networking system 160 may receive from a querying/first user (corresponding to a first user node 202) a search query. The search query may be a text query and may comprise one or more character strings (which may include one or more n-grams). In general, a user may input any character string comprising one or more characters into query field 450 to search for objects on social-networking system 160 that substantially matches the character string. The search query may also be a structured query comprising references to particular nodes or edges from social graph 200. The structured queries may be based on the natural-language strings generated by one or more grammars, as described previously. As an example and not by way of limitation, the search query "Friends of Stephanie" may be a structured query, where "Friends" and "Stephanie" in the search query are references corresponding to particular social-graph elements. The reference to "Stephanie" would correspond to a particular user node 202 (where social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). The search query may be received in any suitable manner, such as, for example, by having the user input the search query into a query field 450 on a webpage of the online social network. Although this disclosure describes receiving particular queries in a particular manner, this disclosure contemplates receiving any suitable queries in any suitable manner. More information on search queries may be found in U.S. patent application Ser. No. 13/556,060, filed 23 Jul. 2012, and U.S. patent application Ser. No. 13/732,175, filed 31 Dec. 2012, each of which is incorporated by reference.

In particular embodiments, social-networking system 160 may parse the search query received from the first user (i.e., the querying user) to identify one or more n-grams. In general, an n-gram is a contiguous sequence of n items from a given sequence of text or speech. The items may be characters, phonemes, syllables, letters, words, base pairs, prefixes, or other identifiable items from the sequence of text or speech. The n-gram may comprise one or more characters of text (letters, numbers, punctuation, etc.) entered by the querying user. An n-gram of size one can be referred to as a "unigram," of size two can be referred to as a "bigram" or "digram," of size three can be referred to as a "trigram," and so on. Each n-gram may include one or more parts from the search query received from the querying user. In particular embodiments, each n-gram may comprise a character string (e.g., one or more characters of text) entered by the first user. As an example and not by way of limitation, social-networking system 160 may parse the search query "all about recipes" to identify the following n-grams: all; about; recipes; all about; about recipes; all about recipes. In particular embodiments, each n-gram may comprise a contiguous sequence of n items from the search query. Although this disclosure describes parsing particular queries in a particular manner, this disclosure contemplates parsing any suitable queries in any suitable manner. In connection with element detection and parsing search queries, particular embodiments may utilize one or more systems, components, elements, functions, methods, operations, or steps disclosed in U.S. patent application Ser. No. 13/556,072, filed 23 Jul. 2012, U.S. patent application Ser. No. 13/732,101, filed 31 Dec. 2012, each of which is incorporated by reference.

In particular embodiments, social-networking system 160 may generate a query command based on a search query received from a querying user. The query command may then be used in a search against objects in one or more data stores 164 of the social-networking system 160. In particular embodiments, the query command may be provided for a search using search indices for one or more data stores 164 of social-networking system 160. The query command may comprise one or more query constraints. Each query constraint may be identified by social-networking system 160 based on a parsing of the search query. Each query constraint may be a request for a particular object-type. In particular embodiments, the query command may comprise query constraints in symbolic expression or s-expression. Social-networking system 160 may parse the search query "Photos I like" to a query command (photos_liked_by:<me>). The query command (photos_liked_by: <me>) denotes a query for photos liked by a user (i.e., <me>, which corresponding to the querying user), with a single result-type of photo. The query constraint may include, for example, social-graph constraints (e.g., requests for particular nodes or nodes-types, or requests for nodes connected to particular edges or edge-types), object constraints (e.g., request for particular objects or object-types), location constraints (e.g., requests for objects or social-graph entities associates with particular geographic locations), other suitable constraints, or any combination thereof. In particular embodiments, the parsing of the search query may be based on the grammar used to generate the search query. In other words, the generated query command and its query constraints may correspond to a particular grammar (or a sub-tree from a grammar forest). In particular embodiments, a query command may comprise prefix and an object. The object may correspond to a particular node in the social graph 200, while the prefix may correspond to a particular edge 206 or edge-type (indicating a particular type of relationship) connecting to the particular node in the social graph 200. As an example and not by way of limitation, the query command (pages_liked_by:<user>) comprises a prefix pages_liked_by, and an object <user>. In particular embodiments, social-networking system 160 may execute a query command by traversing the social graph 200 from the particular node along the particular connecting edges 206 (or edge-types) to nodes corresponding to objects specified by query command in order to identify one or more search results. As an example and not by way of limitation, the query command (pages_liked_by:<user>) may be executed by social-networking system 160 by traversing the social graph 200 from a user node 202 corresponding to <user> along like-type edges 206 to concept nodes 204 corresponding to pages liked by <user>. Although this disclosure describes generating particular query commands in a particular manner, this disclosure contemplates generating any suitable query commands in any suitable manner.

In particular embodiments, social-networking system 160 may access one or more data stores 164 in response to a search query received from a user. Each data store 164 may store one or more objects associated with the online social network. In particular embodiments, social-networking system 160 may search each accessed data store to identify one or more objects associated with the data store 164 that substantially match the search query. Social-networking system 160 may identify matching objects in any suitable manner, such as, for example, by using one or more string matching algorithms to match the character string with a string of characters associated with each of one or more of the objects. As an example and not by way of limitation, in response to a search query "Friends of Mark named Kaiser", social-networking system 160 may access one or more users data stores 164 and search the accessed data stores 164 to identify objects (e.g., user-profile pages) stored in those data stores 164 that match the query. Social-networking system 160 may search each accessed data store using the following query command:

(AND (name: "kaiser")
 (friends_of: <Mark>)).

Social-networking system 160 may access the index servers 330 of each data store 164, causing index server 330 to return results that match the query command. As an example and not by way of limitation, social-networking system 160 may access index server 330 of a users data store 164, causing index server 330 to identify users <Nathen Kaiser>, <Catie Kaiser>, and <Alex Kaiser> (each represented by an user identifier), where each of these users corresponds to a user node 202 connected in the social graph 200 to the user node 202 of the user <Mark> by a friend-type edge 206. Although this disclosure describes identifying particular objects in a particular manner, this disclosure contemplates identifying any suitable objects in any suitable manner. More information on accessing and searching data stores 164 may be found in U.S. patent application Ser. No. 13/560,212, filed 27 Jul. 2012, and U.S. patent application Ser. No. 13/870,113, filed 25 Apr. 2013, each of which is incorporated by reference.

In particular embodiments, when identifying objects that match a search query, social-networking system 160 may identify the objects based in part on a privacy setting associated with the object. Certain objects are unlikely to be visible to the querying user because of the privacy settings associated with the object. As an example and not by way of limitation, an object having privacy settings specifying the object can be accessed by, for example, "only me" or "friends only" may be likely to not be visible to a querying user doing a global search for particular types of object. Similarly, objects having privacy settings specifying, for example, "public" or "friends of friends" may be likely to be visible to the querying user. In order to reduce the number of identified objects that need to be sent to the frontend (e.g., PHP process 310) to generate a sufficient number of search results for the querying user, a coarse privacy index can be used when indexing data stores 164 to reduce the number of invisible results that are sent to the frontend (which may eventually filter them out). In particular embodiments, in response to a query command requesting objects matching a search query, data store 164 may access a coarse privacy index listing the privacy settings for each object stored in the data store 164. This coarse privacy index can then be used to pre-filter results that should be invisible to the querying user (e.g., filter out all objects with an "only me" privacy setting). Thus, when searching a data store 164 for objects matching a search query, social-networking system 160 may use the coarse privacy index to determine whether the privacy setting of an object is likely to make the object visible to the querying user. Social-networking system 160 may then preferentially identify objects having a privacy setting more likely to be visible to the querying user, and not identify (or be less likely to identify) objects having a privacy setting less likely to be visible to the querying user. In particular embodiments, identifying objects based in part on a privacy setting associated with the object may comprise determining whether the privacy setting of an object matches a privacy setting specified in the query command. The query command may be generated such that at least one of the query constraints of the query command request objects having particular privacy settings. In this way, then the query command is executed during the indexing process, the request for objects matching the search query may also specify that the identify object must also match particular privacy settings. As an example and not by way of limitation, continuing with the prior example, in response to a search query "Friends of Mark named Kaiser", social-networking system 160 may search each accessed data store 164 based in part on privacy settings using the following query command:

```
(AND  (name: "kaiser")
      (friends_of: <Mark>)
      (privacy: (<friends_of_friends> OR <public>))).
```

As described previously, searching the users data store 164 without a privacy filter may identify users <Nathen Kaiser>, <Catie Kaiser>, and <Alex Kaiser>. However, the user-profile pages for these users may have privacy settings such that their pages are not visible to the querying user. If, for example, the user <Catie Kaiser> has a user-profile page with a privacy setting of <friends only> (meaning the user-profile page can only be accessed by users corresponding to user nodes 202 that are connected to the user node 202 for <Catie Kaiser> by a friend-type edge 206), then she would not be identified by the query command above because the privacy setting for her user-profile page does not match the query constraint (privacy: (<friends_of_friends> OR <public>)). Thus, the user-profile page for <Catie Kaiser> would not be sent to the frontend PHP process 310, where it would likely be filtered out by access controls. Although this disclosure describes searching based on privacy settings in a particular manner, this disclosure contemplates searching based on privacy settings in any suitable manner.

In particular embodiments, when identifying objects based in part on the privacy settings for the object, social-networking system 160 may identify a particular number of objects having privacy settings likely to make the object visible to the querying user. As an example and not by way of limitation, the query command used to search a data store 164 may use a "weak AND" (WAND) or "strong OR" (SOR) operator to specify a particular number or percentage of object that should be identified as having a particular privacy setting. As an example and not by way of limitation, continuing with the prior example, in response to a search query "Friends of Mark named Kaiser", social-networking system 160 may search each accessed data store 164 based in part on privacy settings using the following query command:

```
(WAND (name: "kaiser")
      (friends_of: <Mark>)
      (privacy: (<friends_of_friends> OR <public>)) :
      optional-weight 0.5).
```

In this example, instead of require that all identified object match the query constraint (privacy: (<friends_of_friends> OR <public>)), the WAND operator allows this constraint to be optionalize with a weight of 0.5, which means that 50% of the identified object must match this constraint, but the remaining 50% do not need to necessarily match the privacy constraint. Although this disclosure describes searching based on privacy settings in a particular manner, this disclosure contemplates searching based on privacy settings in any suitable manner. More information on WAND and SOR operators may be found in U.S. patent application Ser. No. 13/560,901, filed 27 Jul. 2012, which is incorporated by reference.

In particular embodiments, social-networking system 160 may score the identified objects. The objects may be scored based on one or more factors, such as, for example, social-graph information, social-graph affinity, search history, privacy settings, other suitable factors, or any combination thereof. Objects may also be scored based on advertising sponsorship. In particular embodiments, social-networking system 160 may score the objects based on a privacy setting associated with the object. Objects having privacy settings that make the object more likely to be visible to the querying user may be scored better than objects having privacy settings that make them less likely to be visible to the querying user. As an example and not by way of limitation, an object having a privacy setting of "public" may be scored better than an object having a privacy setting of "friends-of-friends". Similarly, an object having a privacy setting of "friends only" may be scored better than an object having a privacy setting of "only me". In particular embodiments, social-networking system 160 may score the objects based on a social-graph affinity associated with the querying user (or the user node 202 of the querying user). Social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. Although this disclosure describes scoring objects in a particular manner, this disclosure contemplates scoring objects in any suitable manner. Furthermore, in connection with social-graph affinity and affinity coefficients, particular embodiments may utilize one or more systems, components, elements, functions, methods, operations, or steps disclosed in U.S. patent application Ser. No. 11/503, 093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, when searching data stores 164 to identify matching objects, social-networking system 160 may only identify and score up to a threshold number of matching nodes in a particular data store 164. This threshold number of matching objects may then be scored and ranked by the social-networking system 160. The threshold number may be chosen to enhance search quality or to optimize the processing of search results. As an example and not by way of limitation, social-networking system 160 may only identify the top N matching objects (i.e., the number to score) in a users data store 164 in response to a query command requesting users. The top N objects may be determined by a static ranking (e.g., ranking based on the current social-graph affinity of the user with respect to the querying user) of the objects in a search index corresponding to the users data store 164. In particular embodiments, the top N identified object may be re-ranked based on the search query itself. As an example and not by way of limitation, if the number to score is 500, the top 500 objects may be identified. These 500 objects may then be ranked based on one or more factors (e.g., match to the search query or other query constraints, social-graph affinity, search history, etc.), and the top M results may then be sent to the frontend to be checked for privacy control before being generated as search results. In particular embodiments, the top results after one or more rounds of rankings may be sent to an aggregator 320 for a final round of ranking, where identified objects may be reordered, redundant results may be dropped, or any other type of results-processing may occur before presentation to the querying user. Although this disclosure describes identifying particular numbers of objects, this disclosure contemplates identifying any suitable numbers of objects. Furthermore, although this disclosure describes ranking objects in a particular manner, this disclosure contemplates ranking objects in any suitable manner.

Figure 5A:
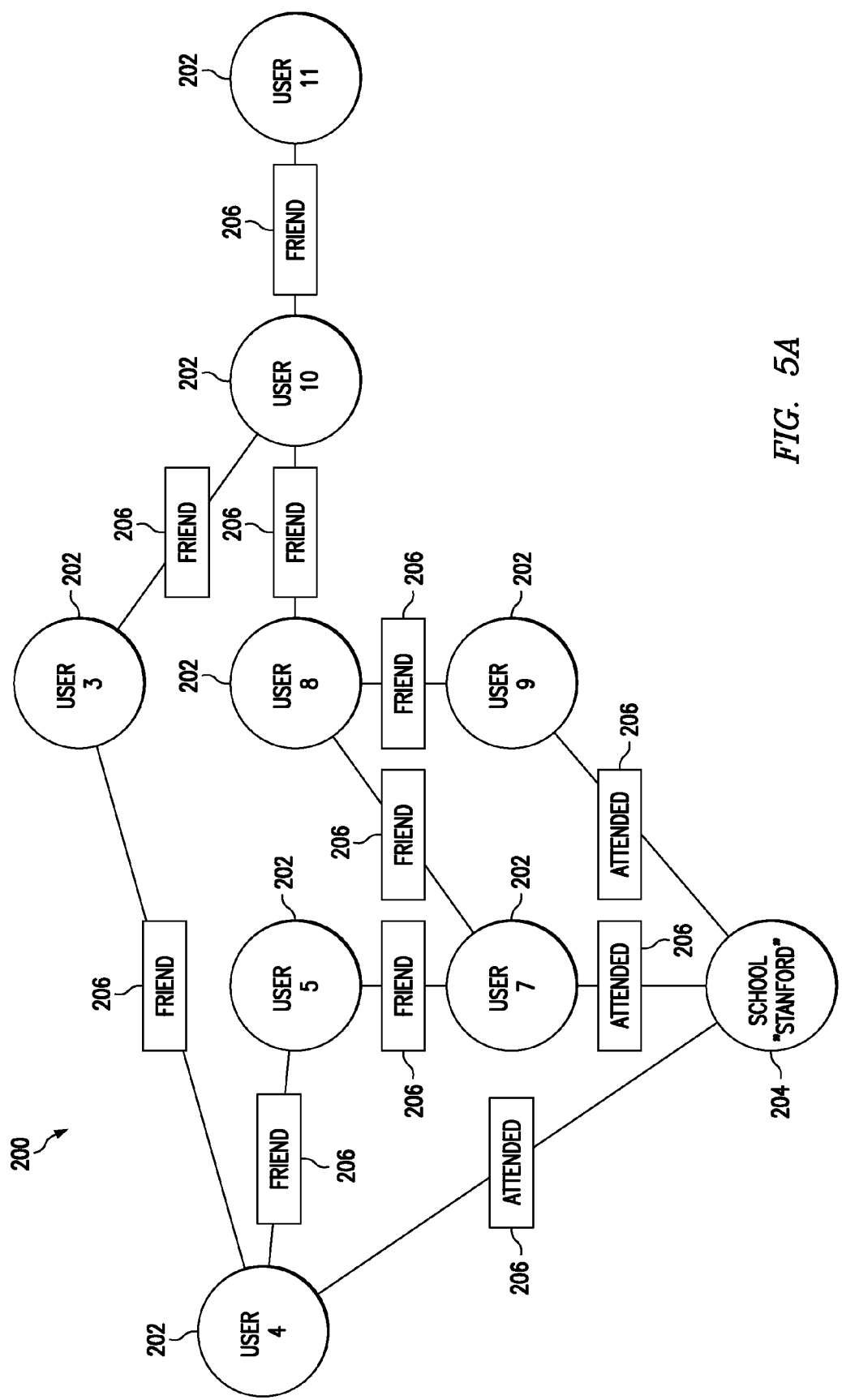
FIG. 5A illustrates an example social graph

In particular embodiments, when generating search results in response to a structured search query, the social-networking system 160 may filter the search results based on privacy settings associated with particular objects. After a search query is indexed by social-networking system 160 (e.g., by an index server 330) and objects satisfying the search query have been identified, social-networking system 160 may then perform privacy checks on each identified object (which may also be referred to as a target object). In particular embodiments, social-networking system 160 may determine for each identified object a visibility of the object with respect to the querying user. Each target object (and more specifically, the target nodes corresponding to the target object) may be associated with privacy settings that specify which other users of the online social network may view or access the content object. As an example and not by way of limitation, particular object (corresponding to particular social-graph elements) may not be visible to the querying user, and thus indexed results including such an object should not be sent to the user as a search result. Consequently, particular target objects may not be displayed in the search results because of the privacy settings associated with that content. FIG. 5A illustrates an example social graph 200. The social graph 200 illustrated in FIG. 5A may be referenced in some of the examples below to illustrate how privacy settings are used to filter search results. Although this disclosure describes filtering search results based on privacy settings in a particular manner, this disclosure contemplates filtering search results based on privacy settings in any suitable manner. More information on privacy settings and filtering search results may be found in U.S. patent application Ser. No. 13/556,017, filed 23 Jul. 2012, which is incorporated by reference.

In particular embodiments, social-networking system 160 may access the privacy settings associated with each target object (or its corresponding node). The privacy settings for each object may define the visibility of the object, the visibility of the node corresponding to the object, or the visibility of edges connecting to that node to users of the social-networking system 160. In this way, the ability of users of the online social network (or even users outside the network) may be restricted by limiting their ability to view or access profile-pages (or other related content objects) associated with particular nodes. As an example and not by way of limitation, a first user's privacy settings specify that his profile-page can only be viewed or accessed by "friends of friends" (i.e., second-degree friends), thereby preventing users who are three or more degrees of separation from the first user from viewing or accessing the first user's profile page. As another example and not by way of limitation, referencing FIG. 5A, the privacy settings for user "9" may specify that his educational information is not visible to other users, and therefore the "attended" edge 206 connecting the user node 202 for user "9" to the concept node 204 corresponding to the school "Stanford" may not be visible to other users. Thus, the privacy settings for user "9" would prevent references to his user node 202 (or corresponding user-profile page) from appearing in search results for users that attended Stanford. Although this disclosure describes accessing particular privacy settings in a particular manner, this disclosure contemplates accessing any suitable privacy settings in any suitable manner.

In particular embodiments, social-networking system 160 may whether an object has a visibility that is visible to the querying user. After indexing a data store 164 in response to a search query from a querying user, as described previously, social-networking system 160 may have identified one or more object matching the search query. The identified objects may also have privacy settings that make the object likely to be visible to the querying user. Social-networking system 160 may then enforce the privacy settings for each identified object by determining whether the privacy settings for a particular object allow it to be accessed by the particular querying user. If the object has a visibility that is visible to the querying user, then social-networking system 160 may select the object to be included in the generated search result. However, if the object has a visibility that is not visible to the querying user, the social-networking system 160 may exclude the object from the generated search results. In particular embodiments, social-networking system 160 may select object corresponding to nodes that are connected to the user node 202 of the querying user in the social graph 200 by a series of nodes and edges 206 that have a visibility that is visible to the querying user. As an example and not by way of limitation, referencing FIG. 5A, the structured query "Friends of User 5" may identify the target nodes for user "4" and user "7." Assuming the querying user can view the node for user "5," then the privacy settings of users "4," "5," and "7" may be accessed to determine whether the edges connecting these users are visible. For example, either users "4" or "5" may have privacy settings that make it so the "friend" edge 206 connecting them is not visible to particular other users; if this edge 206 is visible to the querying user, then the generated search results could include a reference to user "4." Similarly, either users "5" or "7" may have privacy settings that make it so the "friend" edge 206 connecting them is not visible; thus, if this edge 206 is visible to the querying user, then the generated search results could include a reference to user "7." In particular embodiments, the user node 202 for the querying user does not necessarily need to be connected by a visible path to the node corresponding to the identified object; however, there should be at least a path between a node that is visible to the querying user (a source node) and the node. As an example and not by way of limitation, continuing with the prior example, the querying user does not necessarily need to be connected in a path to either user "4" or user "7"; so long as the querying user can view a source node, which may be user "5" in this case, and so long as the querying user can view the path between user "5" and the nodes corresponding to users "4" and "7", then the nodes corresponding to these users may appear in the search results. The querying user may be able to view the source node, for example, because that node is publicly accessible or within a threshold degree of separation of the querying user. Although this disclosure describes enforcing privacy setting in a particular manner, this disclosure contemplates enforcing privacy setting in any suitable manner.

Figure 5B:
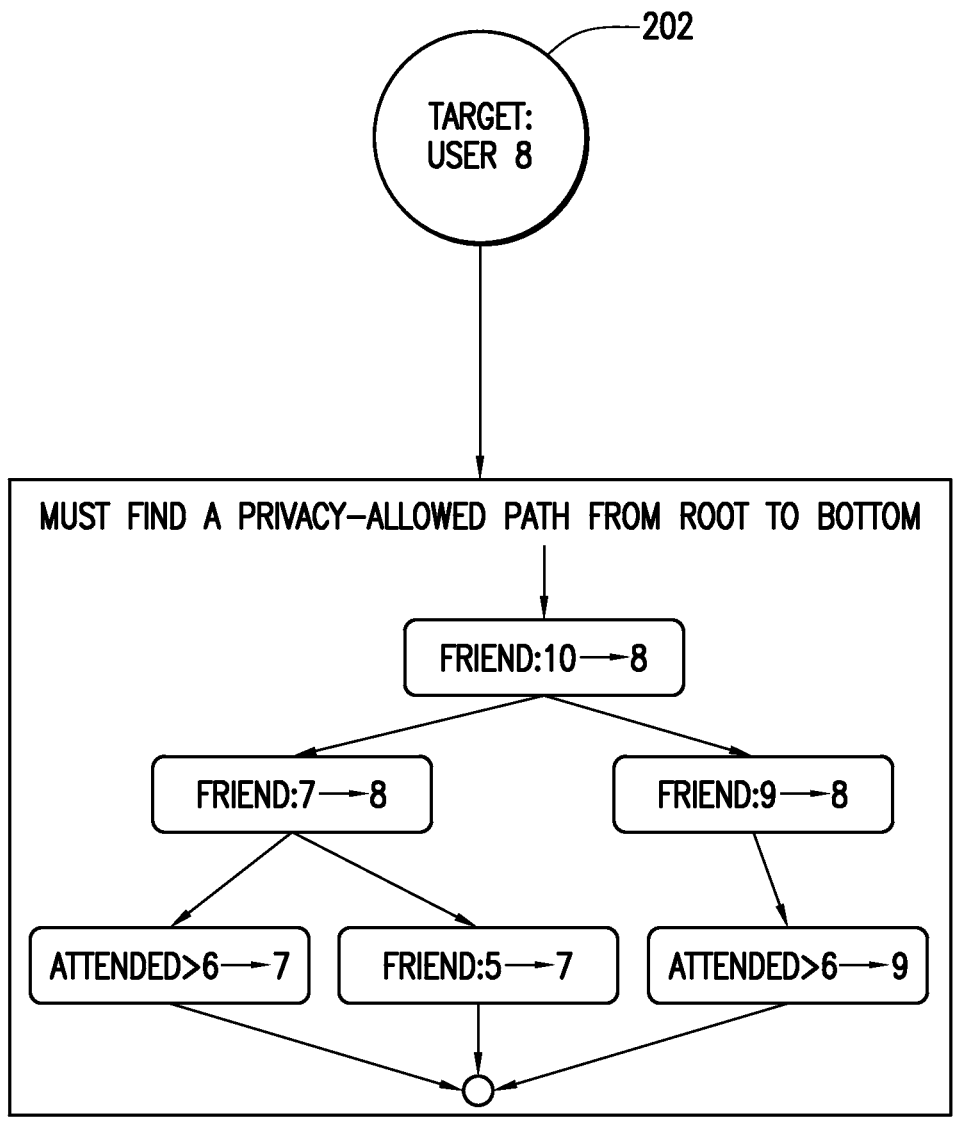
FIG. 5B illustrates an example sub-graph for resolving privacy settings.

FIG. 5B illustrates an example sub-graph for resolving privacy settings. In particular embodiments, the social-networking system 160 may generate a sub-graph for each target node (i.e., for each object identified during indexing). The sub-graph may comprise the first node (i.e., a user node 202 of the querying user), the target node (i.e., the node corresponding to each object identified during indexing), and each node and edge connecting the first node and the target node in the social graph 200. As an example and not by way of limitation, in response to the structured query "Friends of User 10 that are also friends of friends of User 5 or attended Stanford", social-networking system 160 may search one or more users data stores 164 and identify users "3" and "8" as matching objects. Social-networking system 160 may then generate a sub-graph for each target node. The sub-graph corresponding to user "8" is illustrated in FIG. 5B, which illustrates each edge 206 in the path between the querying user and the target node. For example, the edge 206 connecting users "10" and "8" is illustrated in FIG. 5B as "friend:10→8". The social-networking system 160 may then identify, for each sub-graph, each terminal path in the sub-graph connecting the first node to the target node. A terminal path includes the series of nodes and edges connecting the first node to the target node. Of course, multiple terminal paths may exist between the querying user and the target node, as illustrated in FIG. 5B, and each of these terminal paths may be identified. Social-networking system 160 may then determine, for each terminal path in the sub-graph, whether each selected edge in the terminal path has a visibility that is visible to the first user. In other words, the social-networking system 160 may attempt to find whether the sub-graph has any privacy-allowed paths between the querying user and the target node. Where multiple terminal paths exist in a particular sub-graph, the social-networking system 160 may evaluate some or all of the terminal paths to determine whether the edges 206 in each path are visible. The social-networking system 160 may then select each sub-graph having at least one terminal path wherein each edge in the path has a visibility that is visible to the first user. Therefore, where a sub-graph includes multiple terminal paths between the querying user and the target node, the sub-graph may still be selected as having a privacy-allowed path so long as at least one terminal path in the sub-graph is visible to the user. The generated search results would then include references to each target node that corresponds to a selected sub-graph having at least one visible terminal paths. As an example and not by way of limitation, referencing FIG. 5B, there are three possible terminal paths between the querying user and the target node for user "8." So long as at least one of the three possible terminal paths is visible to the querying user, then the target node for user "8" will be included in the search results for the query. In particular embodiments, the user node 202 for the querying user does not necessarily need to be connected by a visible path to the target node; however, there should be at least a path between a node that is visible to the querying user (a source node) and the target node. As an example and not by way of limitation, continuing with the prior example, the querying user does not necessarily need to be connected in a path to either users "3" or "8"; so long as the querying user can view a source node and a path between the source node and the target node, then the target node may appear in search results. In particular embodiments, a terminal path longer then a threshold length may not be a privacy-allowed path. The length of a terminal path may be measured by the number of nodes and edges needed to construct the terminal path. However, if too many nodes and edges much be traversed to generate a terminal path between the querying user and the target node, then that target node may be considered beyond the visibility of the querying user. In other words, if social-networking system 160 determines that a particular target node is beyond a threshold degree-of-separation from the querying user in the social graph 200, that target node may not be visible to the querying user. Although this disclosure describes and FIG. 5B illustrates resolving privacy settings in a particular manner, this disclosure contemplates resolving privacy settings in any suitable manner.

In particular embodiments, in response to a search query received from a querying user, social-networking system 160 may generate one or more search results, where the search results correspond to the search query. Each search result may correspond to a node of the social graph 200. Social-networking system 160 may identify objects (e.g., users, photos, profile pages (or content of profile pages), etc.) that satisfy or otherwise match the search query. A search result corresponding to each identified object may then be generated. As an example and not by way of limitation, in response to the search query "Photos of Matt and Stephanie", social-networking system 160 may identify a photo where the user's "Matt" and "Stephanie" are both tagged in the photo. A search result corresponding to this photo may then be generated and sent to the user. In particular embodiments, social-networking system 160 may generate one or more search result corresponding to objects having a visibility that is visible to the querying user. As discussed above, objects identified during indexing may be filtered based on the privacy settings of the objects. Each search result may correspond to one of the selected objects having a visibility that is visible to the querying user. Similarly, privacy filtering may be used to exclude objects from the search results that have a visibility that is not visible to the querying user. Although this disclosure describes generating search results in a particular manner, this disclosure contemplates generating search results in any suitable manner. More information on generating search results may be found in U.S. patent application Ser. No. 13/731,939, filed 31 Dec. 2012, which is incorporated by reference.

In particular embodiments, social-networking system 160 may send one or more search results to the querying user. The search results may be sent to the user, for example, in the form of a list of links on the search-results webpage, each link being associated with a different webpage that contains some of the identified resources or content. In particular embodiments, each link in the search results may be in the form of a Uniform Resource Locator (URL) that specifies where the corresponding webpage is located and the mechanism for retrieving it. Social-networking system 160 may then send the search-results webpage to the web browser 132 on the user's client system 130. The user may then click on the URL links or otherwise select the content from the search-results webpage to access the content from social-networking system 160 or from an external system (such as, for example, third-party system 170), as appropriate. In particular embodiments, each search result may include link to a profile page and a description or summary of the profile page (or the node corresponding to that page). The search results may be presented and sent to the querying user as a search-results page. When generating the search results, social-networking system 160 may generate one or more snippets for each search result, where the snippets are contextual information about the target of the search result (i.e., contextual information about the social-graph entity, profile page, or other content corresponding to the particular search result). In particular embodiments, social-networking system 160 may only send search results having a score/rank over a particular threshold score/rank. As an example and not by way of limitation, social-networking system 160 may only send the top ten results back to the querying user in response to a particular search query. Although this disclosure describes sending particular search results in a particular manner, this disclosure contemplates sending any suitable search results in any suitable manner.

Figure 6:
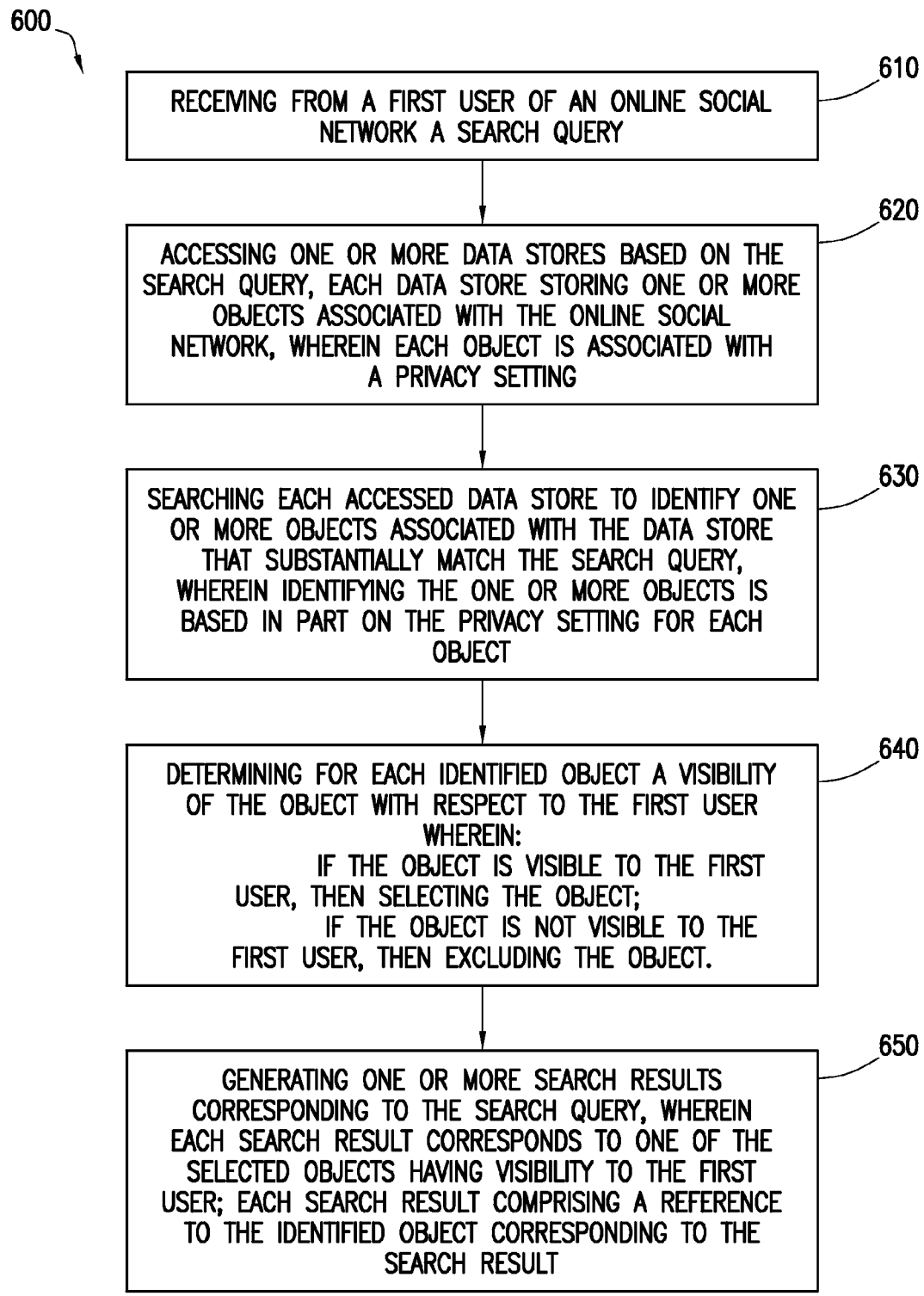
FIG. 6 illustrates an example method for searching an online social network using approximate privacy indexing.

FIG. 6 illustrates an example method 600 for searching an online social network using approximate privacy indexing. The method may begin at step 610, where social-networking system 160 may receive from a first user of an online social network a search query. The search query may be, for example, a text query comprising one or more n-grams, or a structured query comprising references to particular nodes or edges from social graph 200. At step 620, social-networking system 160 may access one or more data stores 164 based on the search query. Each data store 164 may store one or more objects associated with the online social network Each object may be associated with a privacy setting. At step 630, social-networking system 160 may search each accessed data store 164 to identify one or more objects associated with the data store 164 that substantially match the search query. Social-networking system 160 may identify the objects based in part on the privacy setting for each object. At step 640, social-networking system 160 may determine for each identified object a visibility of the object with respect to the first user. If social-networking system 160 determines that the object is visible to the first user, then social-networking system 160 may select the object. However, if social-networking system 160 determines that the object is non visible to the first user, then social-networking system 160 may exclude the object. At step 650, social-networking system 160 may generate one or more search results corresponding to the search query. Each search result may correspond to one of the selected objects having visibility that is visible to the first user. Furthermore, each search result may comprise a reference to the identified object corresponding to the search result. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
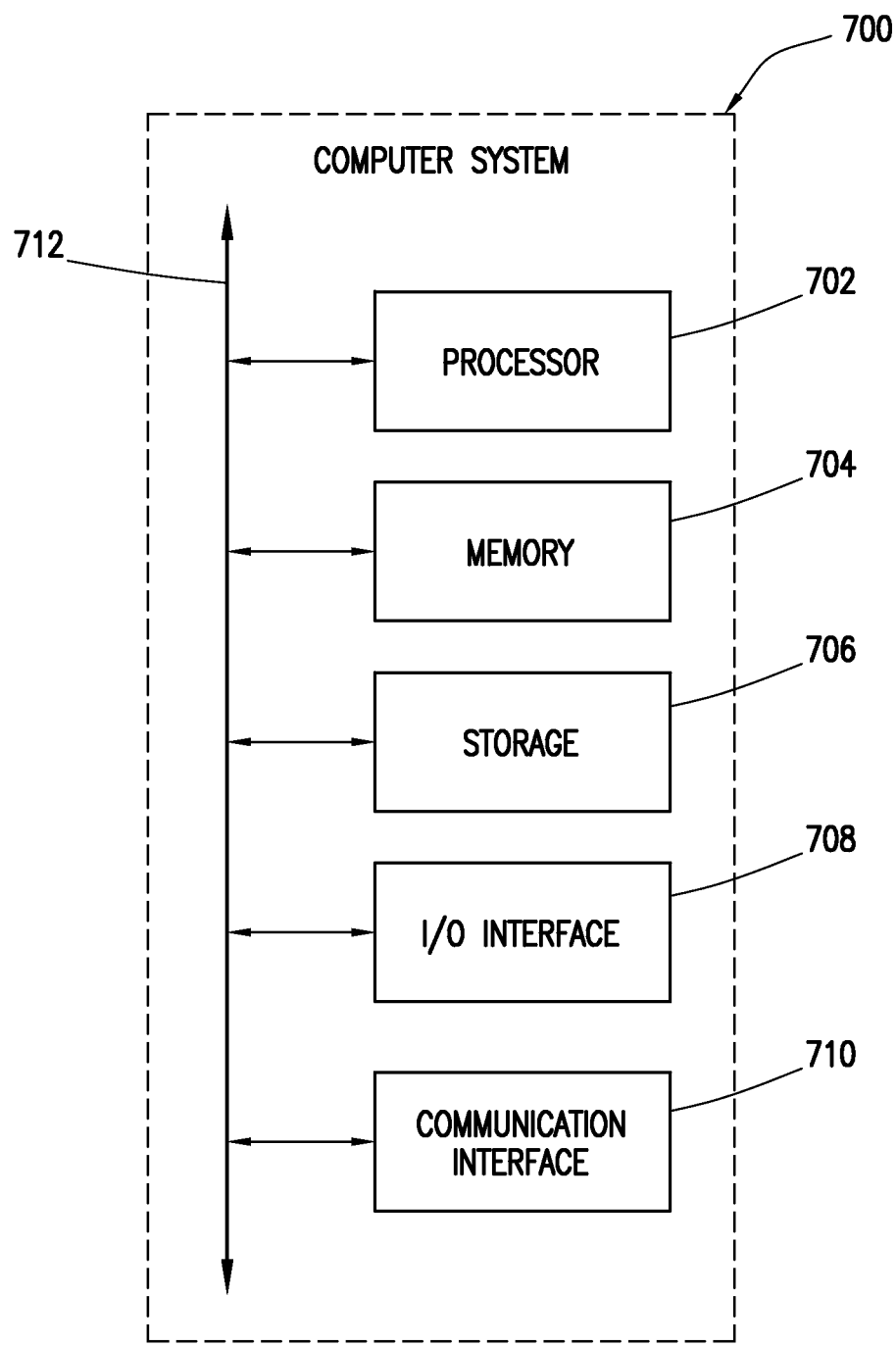
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices:
   receiving from a first user of an online social network a search query;
   searching one or more data stores to identify one or more objects associated with the online social network that substantially match the search query, wherein each object is associated with a privacy setting, and wherein identifying the one or more objects is based in part on identifying a percentage of objects having a privacy setting likely to make the object visible to the first user;
   determining for each identified object a visibility of the object with respect to the first user, wherein:
      when the object is visible to the first user, then selecting the object; and
      when the object is not visible to the first user, then excluding the object; and
   generating one or more search results corresponding to the search query, wherein each search result corresponds to one of the selected objects having visibility that is visible to the first user; each search result comprising a reference to the identified object corresponding to the search result.

2. The method of claim 1, further comprising sending to the first user one or more of the search results.

3. The method of claim 1, further comprising filtering each excluded object from the search results.

4. The method of claim 1, further comprising scoring each identified object based on the privacy setting associated with the object.

5. The method of claim 1, further comprising scoring each identified object based on a social-graph affinity associated with the first node with respect to the identified object.

6. The method of claim 1, wherein the privacy setting defines a visibility of the object with respect to users accessing the online social network.

7. The method of claim 1, wherein identifying the one or more objects is further based in part on determining whether the privacy setting of the object is likely to make the object visible to the first user.

8. The method of claim 1, further comprising generating a query command based on the search query, the query command comprising one or more query constraints.

9. The method of claim 8, wherein:
   the query command comprises a privacy query constraint requesting objects having a first privacy setting; and
   identifying the one or more objects based in part on the privacy setting for each object comprises determining whether the privacy setting of the object matches the first privacy setting.

10. The method of claim 1, further comprising:
    accessing a social graph comprising a plurality of nodes and a plurality of edges connecting the nodes, each of the edges between two of the nodes representing a single degree of separation between them, wherein each node of the plurality of nodes corresponds to a particular object, the nodes comprising:
       a first node corresponding to the first user; and a plurality of second nodes that each correspond to a concept or a second user associated with the online social network.

11. The method of claim 10, wherein the search query is a structured query comprising references to one or more selected nodes from the plurality of nodes and one or more selected edges from the plurality of edges.

12. The method of claim 10, wherein each search result corresponds to a node of the plurality of nodes.

13. The method of claim 10, wherein determining for each identified object a visibility of the object with respect to the first user comprises, for each identified object:
   identifying a node of the plurality of nodes corresponding to the identified object; and
   determining whether the identified node is connected to the first node in the social graph by a series of nodes and edges that each have a visibility that is visible to the first user.

14. The method of claim 10, wherein determining for each identified object a visibility of the object with respect to the first user comprises, for each identified object:
   identifying a node of the plurality of nodes corresponding to the identified object; and
   determining whether the identified node is within a threshold degree of separation from the first node in the social graph.

15. The method of claim 10, wherein the privacy setting associated with each object defines a visibility of the node corresponding to the object.

16. The method of claim 10, wherein the privacy setting associate with each object defines a visibility of one or more of the edges connected to the node corresponding to the object.

17. The method of claim 1, wherein the search query is a text query comprising one or more n-grams.

18. One or more computer-readable non-transitory storage media embodying software that is operable when executed to:
   receive from a first user of an online social network a search query;
   search one or more data stores to identify one or more objects associated with the online social network that substantially match the search query, wherein each object is associated with a privacy setting, and wherein identifying the one or more objects is based in part on identifying a percentage of objects having a privacy setting likely to make the object visible to the first user;
   determine for each identified object a visibility of the object with respect to the first user, wherein:
      when the object is visible to the first user, then select the object; and
      when the object is not visible to the first user, then exclude the object; and
   generate one or more search results corresponding to the search query, wherein each search result corresponds to one of the selected objects having visibility that is visible to the first user; each search result comprising a reference to the identified object corresponding to the search result.

19. A system comprising: one or more processors; and a memory coupled to the processors comprising instructions executable by the processors, the processors operable when executing the instructions to:
   receive from a first user of an online social network a search query;
   search one or more data stores to identify one or more objects associated with the online social network that substantially match the search query, wherein each object is associated with a privacy setting, and wherein identifying the one or more objects is based in part on identifying a percentage of objects having a privacy setting likely to make the object visible to the first user;
   determine for each identified object a visibility of the object with respect to the first user, wherein:
      when the object is visible to the first user, then select the object; and
      when the object is not visible to the first user, then exclude the object; and
   generate one or more search results corresponding to the search query, wherein each search result corresponds to one of the selected objects having visibility that is visible to the first user; each search result comprising a reference to the identified object corresponding to the search result.

* * * * *